(12) United States Patent
Chung

(10) Patent No.: US 8,152,431 B2
(45) Date of Patent: Apr. 10, 2012

(54) STOCKING SYSTEM

(75) Inventor: Hee Uk Chung, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 5 days.

(21) Appl. No.: 12/453,779

(22) Filed: May 21, 2009

(65) Prior Publication Data

US 2009/0238666 A1    Sep. 24, 2009

Related U.S. Application Data

(63) Continuation of application No. 11/088,825, filed on Mar. 25, 2005, now Pat. No. 7,611,323.

(30) Foreign Application Priority Data

Mar. 25, 2004   (KR) .................. 10-2004-0020429

(51) Int. Cl.
*B65G 65/00* (2006.01)
(52) U.S. Cl. ........................... 414/270; 700/214
(58) Field of Classification Search .......... 414/270, 414/279–281; 700/213, 214, 245, 247–249; 235/383, 384
See application file for complete search history.

(56) References Cited

U.S. PATENT DOCUMENTS

| | | | |
|---|---|---|---|
| 3,497,088 A | 2/1970 | Lemelson | 414/273 |
| 3,978,995 A | 9/1976 | Zollinger et al. | 414/279 |
| 4,074,120 A | 2/1978 | Allred et al. | 235/419 |
| 4,265,582 A | 5/1981 | Theobald | 414/279 |
| 4,312,623 A | 1/1982 | Allred et al. | 414/807 |
| 4,773,807 A | 9/1988 | Kroll et al. | 414/282 |
| 6,702,541 B1 | 3/2004 | Lee | 414/253 |
| 6,948,899 B2 | 9/2005 | Lee | 414/254 |
| 2002/0037208 A1 | 3/2002 | Patrito | 414/280 |
| 2003/0044262 A1 | 3/2003 | Inui | 414/331.01 |
| 2004/0042880 A1 | 3/2004 | Lee | 414/277 |
| 2004/0128024 A1 | 7/2004 | Carlson | 700/218 |
| 2005/0095093 A1 | 5/2005 | Hansl | 414/277 |
| 2005/0105992 A1 | 5/2005 | An et al. | 414/280 |

FOREIGN PATENT DOCUMENTS

| | | |
|---|---|---|
| KR | 10-2001-0047246 A | 6/2001 |
| KR | 10-2001-0068326 A | 7/2001 |

*Primary Examiner* — Joshua Rudawitz
(74) *Attorney, Agent, or Firm* — McKenna Long & Aldridge, LLP

(57) ABSTRACT

The present invention relates generally to a stocking system and its operating method. The stocking system comprises a shelf assembly, a first crane, and a second crane. The shelf assembly stores a plurality of cassettes. The first crane is installed at one side of the shelf assembly and loads/unloads the cassettes to/from the shelf assembly. The second crane is installed at the other side of the shelf assembly and loads/unloads the cassettes to/from the shelf assembly.

5 Claims, 5 Drawing Sheets

STOCKING SYSTEM

This application is a Continuation of pending application Ser. No. 11/088,825, filed Mar. 25, 2005 now U.S. Pat. No. 7,611,323, which claims priority to Korean Patent Application No. 10-2004-20429, filed Mar. 25, 2004, all of which are hereby incorporated by reference for all purposes as if fully set forth herein.

BACKGROUND OF THE INVENTION

1. Field of the Invention

The present invention relates generally to a stocking system for loading and unloading cassettes containing substrates and, more particularly, to a stocking system having improved mechanisms to store and transfer cassettes.

2. Discussion of the Related Art

A stocking system is a storage system to handle work pieces, and is generally used in manufacturing lines for liquid crystal display (LCD) devices.

LCD devices are used in clocks, calculators, monitors of personal computers, notebooks, aviation instruments, and portable personal appliances. A typical liquid crystal display panel of the LCD device includes a TFT (thin-film transistor) array substrate and a color-filter array substrate coupled together at a constant cell gap and a liquid crystal material filled in the cell gap between the two substrates.

Manufacturing processes of the liquid crystal display device may be generally divided into array, cell, and module processes.

A glass substrate is the most commonly utilized substrate for the liquid crystal display panel. The glass substrate is loaded in a box, commonly called as a cassette, and transported to manufacturing equipment for individual processes. The glass substrates of the liquid crystal display panels may be transported or returned in sequence or in a group from one manufacturing apparatus to another in the manufacturing processes.

The stocking system is a system that loads, stores, and unloads a plurality of the cassettes containing substrates manufactured in a unit process or cassettes containing substrates to be supplied to a unit process.

FIG. 1 is a schematic top view illustrating a stoker system according to the related art.

As illustrated in FIG. 1, the related art stocking system 10 comprises a first shelf line 11 storing a plurality of cassettes, a second shelf line 12 parallel to the first shelf line 11 at a designated interval, and an automated crane 13 located between the first shelf line 11 and second shelf line 12 to transport the cassettes.

To store a plurality of the cassettes, individual shelf lines 11 and 12 have a plurality of loading spaces arranged horizontally in rows, and stacked on top of each other. Each loading space has a floor.

The automated crane 13 transports the cassettes to a given position in the stocking system. The automated crane 13 includes a crane arm 14, which moves horizontally at a given stroke toward the shelf lines 11 and 12 so as to load/unload the cassettes to/from the shelf lines 11 and 12.

However, the related art stocking system may have the following disadvantages.

Firstly, because the related art stocking has only one crane, an entire manufacturing line may stop when the crane is out of order or is otherwise undergoing maintenance.

Secondly, because the related art stocking has only one crane, increasing the number of cassettes to be transported per unit time may overload the crane, thereby delaying cassette-handling times.

Finally, the crane arm of a related art stocking is designed to have a limited stroke in the horizontal direction and operate only with the shelf lines installed on the both sides of the crane. When additional shelf lines are installed adjacent to the existing shelf lines to increase cassette-storing capacity, the crane arm cannot reach the added shelf lines.

SUMMARY OF THE INVENTION

Accordingly, the present invention is directed to a stocking system for loading/unloading cassettes that substantially obviates one or more of the problems due to limitations and disadvantages of the related art.

An advantage of the present invention is to provide a more robust stocking system in support of LCD manufacturing.

Another advantage of the present invention is to provide stocking system that better accommodate wide ranges in load requirements.

Another advantage of the present invention is to provide a stocking system having a plurality of cranes that can better accommodate a crane being inoperable.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a stocking system comprises a shelf assembly for storing a plurality of cassettes, the shelf assembly having a first shelf line and a second shelf line parallel and adjacent to the first shelf line, the first shelf line and the second shelf line having a plurality of storage compartments open at a front side and a back side; a first crane located at a front side of the first shelf line, the first crane for loading and unloading a cassette to and from the first shelf line and the second shelf line; and a second crane located at a front side of the second shelf line, the second crane for loading and unloading the cassette to and from the first and second shelf line.

In another aspect of the present invention, a stocking system comprises a first shelf line for storing a plurality of cassettes; a second shelf line located adjacent and parallel to the first shelf line, the second shelf line for storing a plurality of cassettes; a first crane located at a first side of the first and second shelf lines, the first crane for loading and unloading the cassette to and from the first shelf line and the second shelf line; and a second crane located at a second side of the first and second shelf lines, the second crane for loading and unloading a cassette to and from the first and second shelf lines.

In another aspect of the present invention, a method of operating a stocking system having a first shelf line, a second shelf line adjacent and parallel to the first shelf line, a first crane located at a side of the first shelf line and for loading and unloading the cassette to and from the first shelf line and the second shelf line, a second crane located at a side of the second shelf assembly and for loading and unloading a cassette to and from the first shelf line and the second shelf line, the method comprises determining whether the first crane is operable; determining whether the second crane is operable;

determining a number of the cassettes to be transported per unit time; comparing the number of the cassettes with a preset number; operating at least one of the first crane and the second crane, depending on whether the first crane is operable, the second crane is operable, and the result of the comparing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
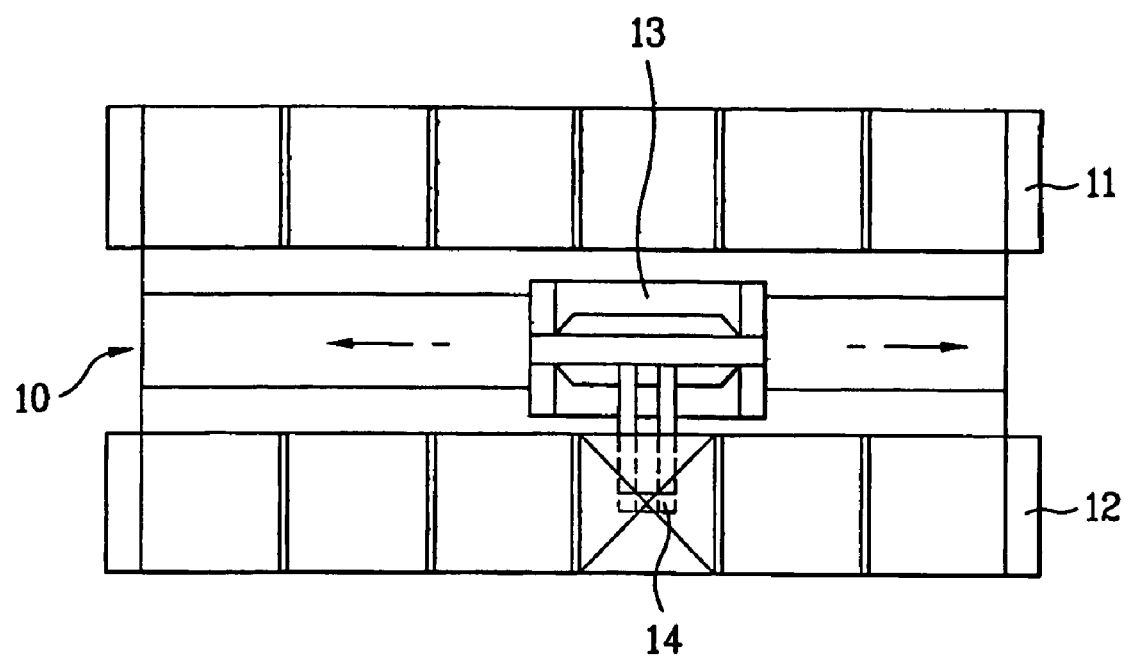
FIG. 1 is a schematic top view illustrating a stoker system according to the related art.
Figure 2:
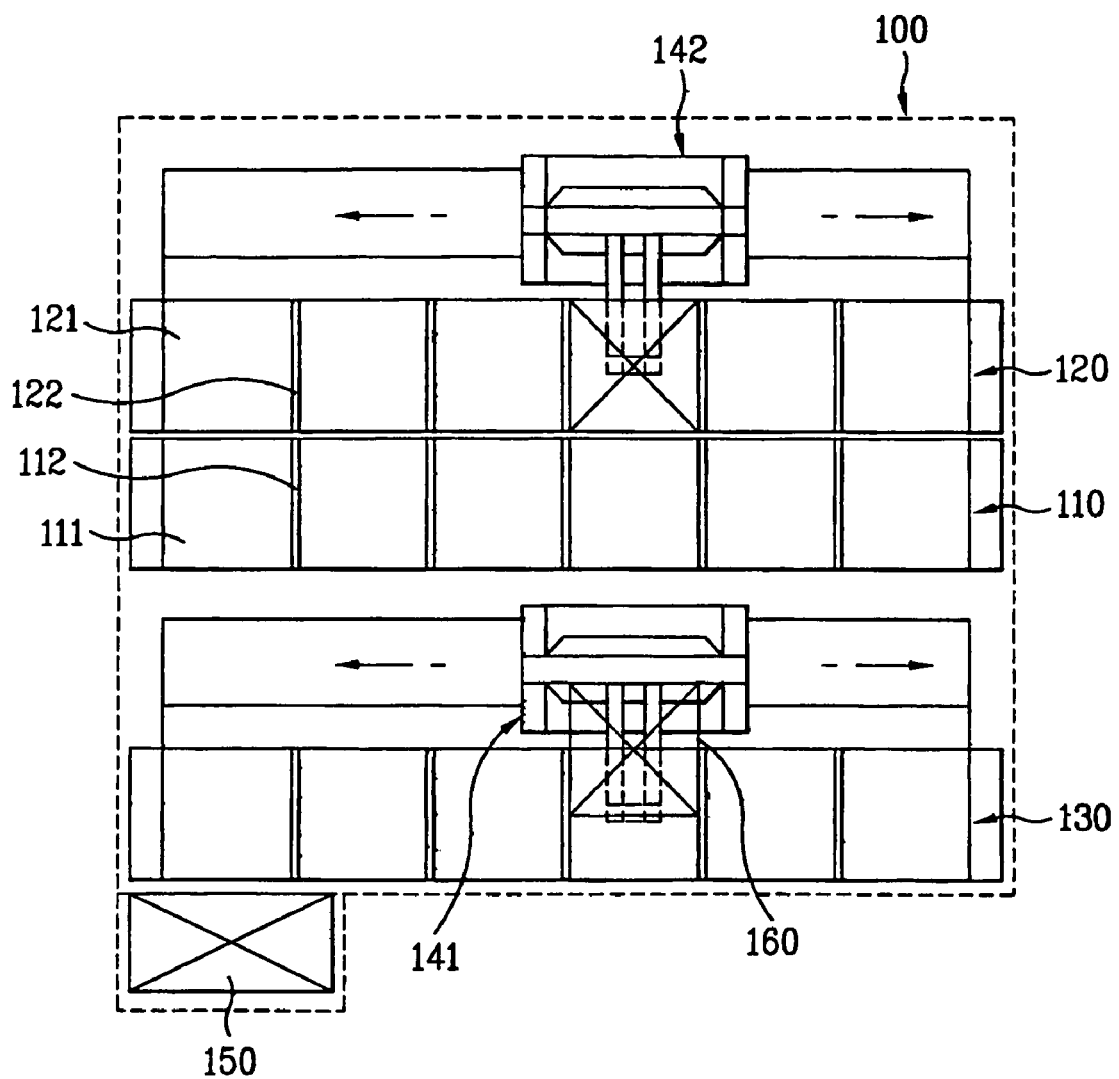
FIG. 2 is a top view illustrating an exemplary stocking system according to an embodiment of the present invention.
Figure 3:
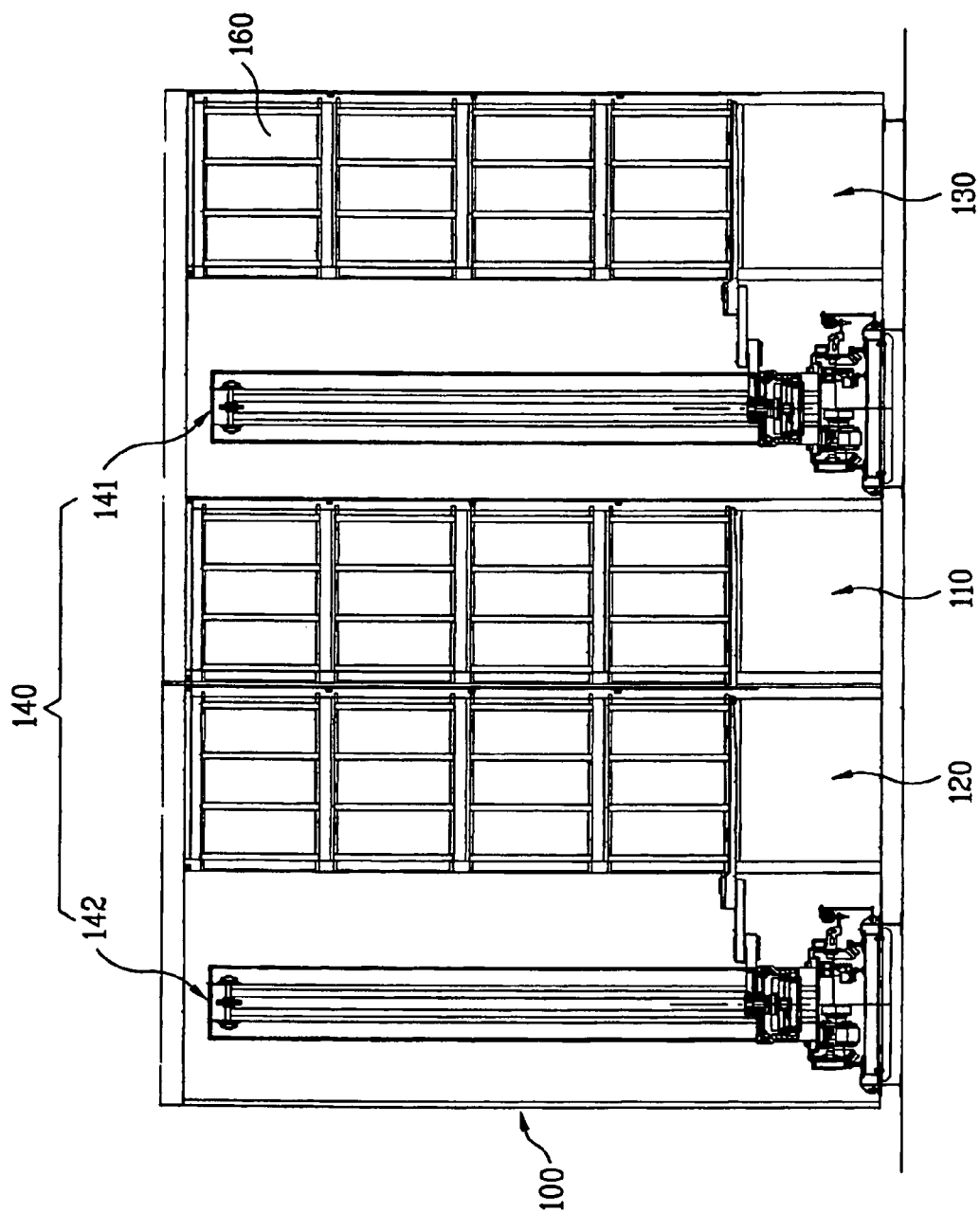
FIG. 3 is a side view illustrating the stocking system of FIG. 2.

An exemplary stocking system 100 according to the present invention, as illustrated in FIGS. 2 and 3, comprises a shelf assembly for storing a plurality of cassettes, and a plurality of cranes 141 and 142 for transporting the cassettes to load/unload the cassettes to/from the shelf assembly.

The shelf assembly comprises a first shelf line 110 extending lengthwise either in the vertical or horizontal direction, and a second shelf line 120 located adjacent to the first shelf line 110.

To store the cassettes, a plurality of storage compartments 111 and 121 are provided in each one of the shelf lines 110 and 120, usually formed in a long rectangular frame, along vertical and horizontal directions.

The shape and size of the storage compartment 111 or 121 may depend upon the shape of the cassette. Individual storage compartments 111 and 121 are formed with a plurality of separator walls 112 and 122 spaced lengthwise in the horizontal direction and extending in the vertical direction thereby partitioning the shelf line in the horizontal direction, and with a plurality of support protrusions (not shown) protruding horizontally from the separator walls 112 and 122 and arranged vertically so as to support the lower part of the cassettes.

A vertical cross-section of the storage compartment may have a similar shape as the cassette to be stored. For example, in the case of rectangular cassettes, the vertical cross-section of the storage compartment may be formed in a rectangular shape. Storage compartments having a rectangular vertical cross-section are arranged along the vertical and horizontal direction to form individual shelf lines. The shelf lines may also have other various structures in addition to the one described above.

Further, each storage compartment may be open from its front side to back side so that a the cassette 160 may be loaded or unloaded. The storage compartments of adjacent shelf lines are opened horizontally each another.

First and second cranes 141 and 142 are respectively provided at either side of the first and second shelf lines 110 and 120. The cranes 141 and 142 load/unload the cassettes 160 to/from the storage compartments 111 and 121 formed on the shelf lines 110 and 120. The first crane 141 is installed close to the first shelf line 110, and the second crane 142 is installed close to the second shelf line 120.

The stocking system 100 may further comprise a third shelf line 130 located parallel to the shelf lines 110 and 120, with the first crane 141 between the third shelf line 130 and the shelf lines 110 and 120. In addition, though not illustrated in FIG. 2 or 3, the stocking system 100 may further comprise a fourth shelf line located parallel to the shelf lines 110 and 120, with the second crane 142 located between the fourth shelf line and the shelf lines 110 and 120. Additional shelf lines may be installed close to the third and fourth shelf lines.

If the third shelf line 130 and the fourth shelf line (not shown) are installed, the stocking system 100 may have a significantly increased cassette-storing capacity.

Figure 4:
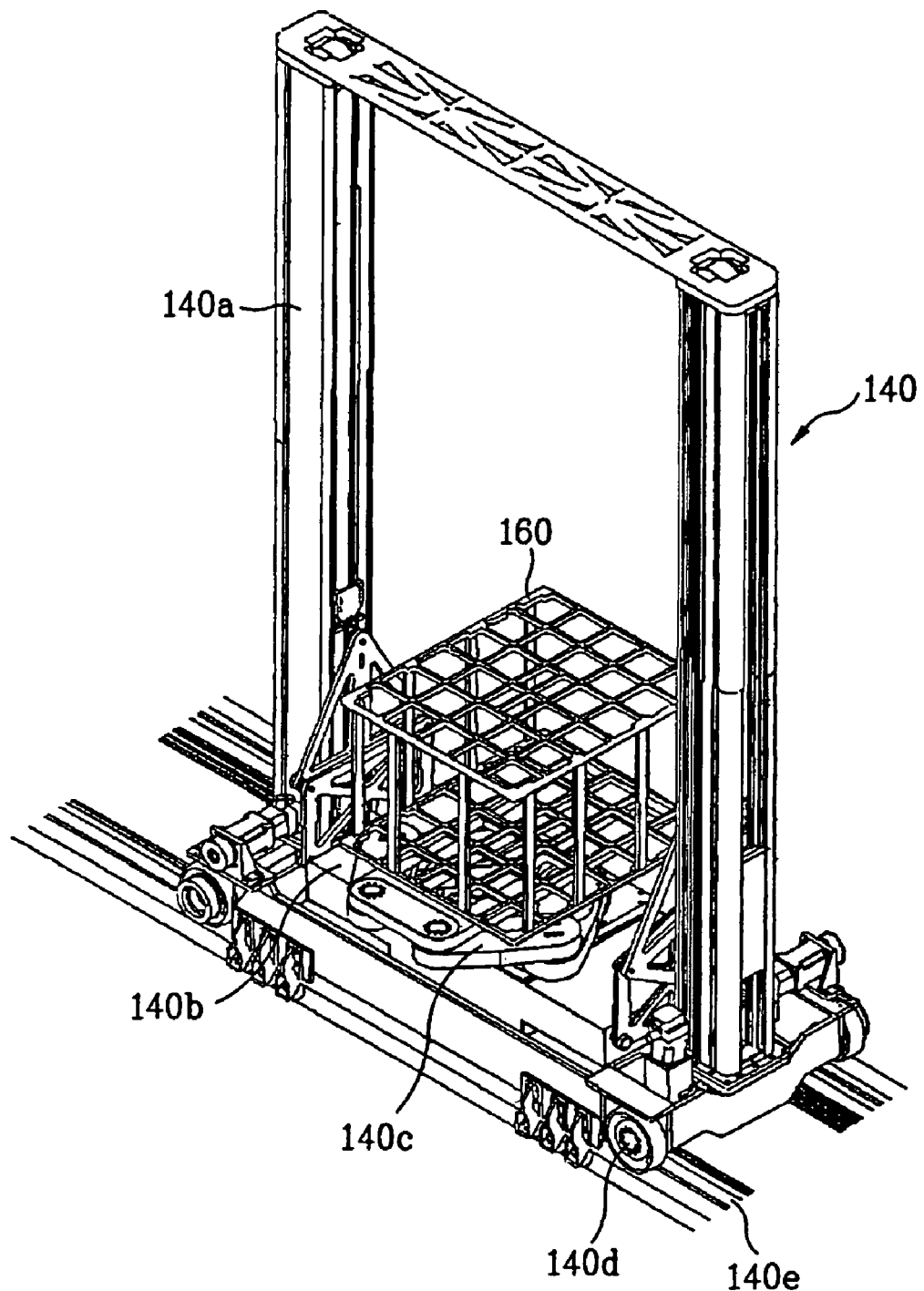
FIG. 4 is a perspective view illustrating an exemplary crane of the stocking system according to the present invention.

FIG. 4 is a perspective view illustrating an exemplary crane of the stocking system according to the present invention. The first and second cranes 141 and 142 according to the present invention may have a substantially similar structure.

An exemplary crane 140 comprises a main frame 140a, a vertical lift 140b, and a crane arm 140c. The main frame 140a moves along the horizontal direction of the shelf lines. The vertical lift 140b is attached to the main frame 140a and moves up and down (the vertical direction). The crane arm 140c is linked with the vertical lift 140b and loads/unloads the cassettes 160 to/from the shelf lines.

The main frame 140a of the crane 140 has a rectangular frame structure, and has wheels 140d allowing the crane 140 to move along the horizontal direction of the shelf lines. To guide the wheels 140d, a guiding means such as a rail 140e may be installed on the passageway of the crane 140.

The vertical lift 140b may be made with a plate moving up and down along the both inner walls of the main frame 140a. For the up and down movement of the vertical lift 140b, long guiding grooves (not shown) are formed along the up and down direction in the inner walls of the main frame 140a. Each end of the vertical lift 140b is coupled with power-driven chains, belts, or ropes so that the vertical lift 140b may move up and down.

The crane arm 140c is supported by the vertical lift 140b, and horizontally moves to load/unload the cassettes 160 to/from the storage compartments. The crane arm 140c supports the lower portion of the cassette 160, and may load/unload the cassettes through rotational movement or horizontal sliding movement toward the shelf lines.

In an exemplary embodiment, the crane arm 140c is provided to stretch out to multiple shelf lines. Referring to FIGS. 2 and 3, when the second crane 142 operates to load/unload the cassettes 160 to/from the first shelf line 110, it has to stretch out its crane arm 140c farther than it does when it loads/unloads cassettes 160 to/from the second shelf line 120. Similar explanations may be given to the first crane 141. The crane arm 140c may have a variety of structures such as multi-joint arms and multi-layer sliding plates.

With the above structure, the first crane 141 may unload a cassette 160 stored in a storage compartment of one of the first, second, and third shelf lines 110, 120, and 130, and then may transport and load the cassette 160 to another storage compartment within the same or other shelf lines.

Similarly, the second crane 142 may unload a cassette 160 stored in a storage compartment of one of the first shelf line 110, second shelf line 120, and a fourth shelf line (not shown), and then may transport and load the cassette 160 to another storage compartment within the same or other shelf lines.

If additional shelf lines are installed close to the third and fourth shelf lines, the crane arm 140c can stretch out bi-directionally to multiple shelf lines from the main frame 140a of the crane 140.

The exemplary stocking system 100 further comprises an in-port (not shown) and an out-port (not shown) through which the cassettes are loaded and unloaded respectively by an automated guided vehicle (not shown).

A control unit (not shown) controls the automated guided vehicle and components of the stocking system 100 so that the cassettes are properly loaded, stored, and unloaded. When a cassette is put into the in-port by the automated guided vehicle, the cassette is stored in the storage compartment assigned by commands of the control unit. When a cassette is taken out, according to commands of the control unit, the cassette in the out-port is transported to another process apparatus by the automated guided vehicle.

By modifying the size and/or shape of the storage compartments of the shelf line and the structure of the crane, the stocking system 100 may also be utilized for storing other types of work piece besides the cassettes loading substrates of the liquid crystal display devices.

Figure 5:
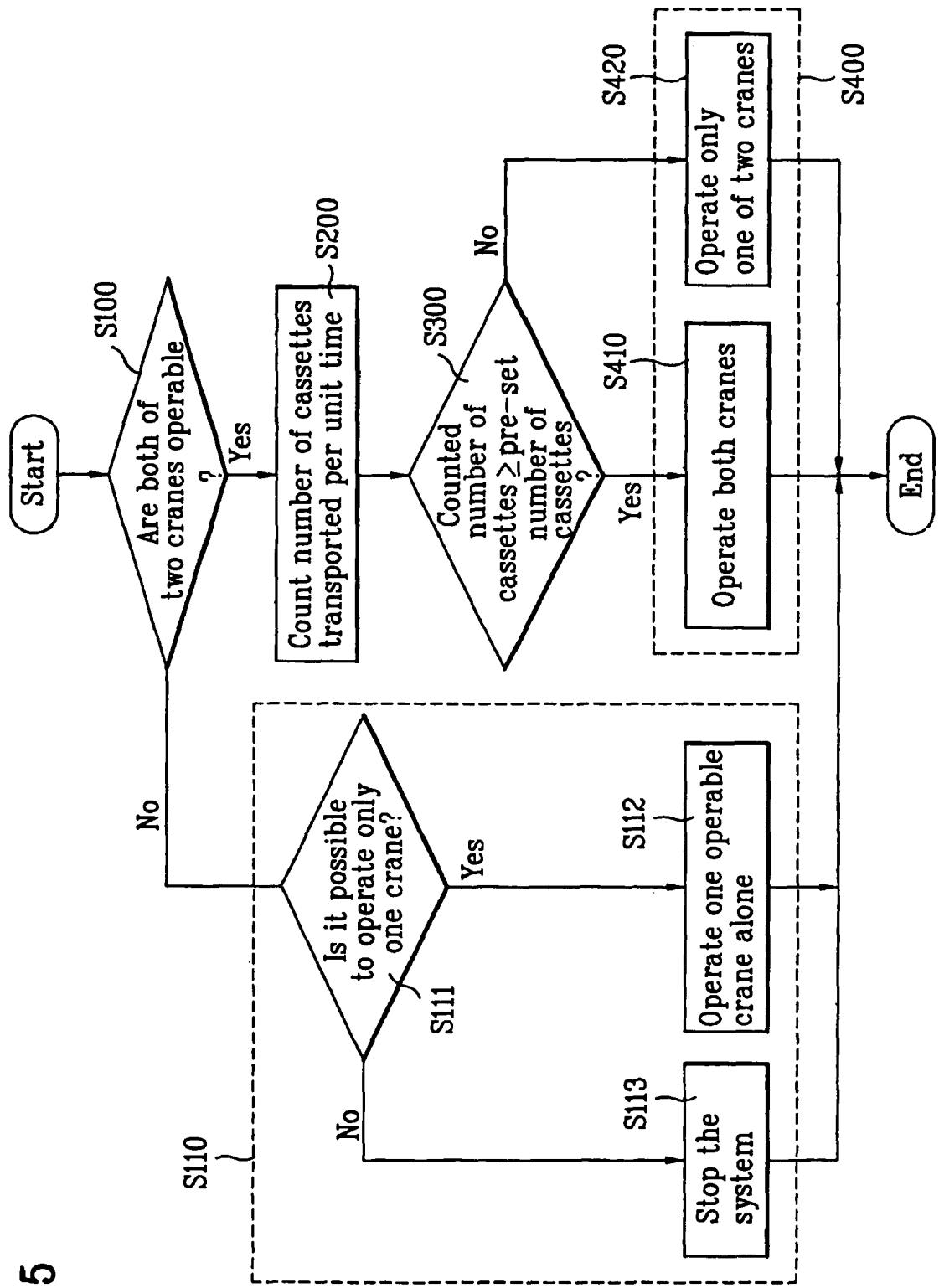
FIG. 5 is a flowchart illustrating an exemplary operating method of the stocking system according to the present invention.

FIG. 5 is a flowchart illustrating an exemplary operating method of the stocking system according to the present invention.

To operate the stocking system 100, the control unit checks whether both of the first and second cranes 141 and 142 are operable (S100). If both are operable, the control unit operates the cranes 141 and 142 selectively in response to the anticipated load on the stocking system 100.

The control unit counts the number of transported cassettes per unit time (S200), compares it with a pre-set number of cassettes transportable per unit time (S300), and then operates the system in response to the comparison result (S400). If the number of transported cassettes per unit time is greater than or equal to the pre-set number, the control unit operates both of the first and second cranes 141 and 142 (S410). Otherwise, the control unit operates either the first crane 141 or the second crane 142 (S420), thereby operating the stocking system 100 more efficiently.

If only one of the cranes 141 and 142 is not operable, or neither of them is operable, the stocking system 100 is operated depending upon the state of cranes 141 and 142 (S110).

For example, the control unit checks whether one of the first and second cranes 141 and 142 are operable (S111). If only one of the cranes 141 and 142 is operable, the operable crane is operated (S112) to transport a cassette from the in-port to the storage compartment assigned by the control unit 150; or to transport a cassette stored in a storage compartment to the other storage compartment of the same or the other shelf line; or to the out-port according to commands of the control unit 150. If none of the cranes 141 and 142 are operable, the stocking system 100 stops its operation (S113).

Referring to the stocking system 100 illustrated in FIG. 2, if the first crane 141 is not operable, the first and second shelf lines 110 and 120 may be served by the second crane 142. If the second crane 142 is not operable, the first, second, and third shelf lines 110, 120, and 130 may be served by the first crane 141.

The steps described above may be repeated by the control unit to transport the cassettes during operations of the stocking system according to the present invention.

The stocking system according to the present invention provides the following features. First, if one of the cranes is not operable due to failure or any other reason, the other crane may still operable. Failure of one crane does not cause the manufacturing line to stop. Second, with improved arrangements of the cranes and the shelf lines, increasing the number of cassettes to be transported per unit time does not cause cassette-handling processes to be delayed, thereby improving the manufacturing productivity. Third, having a crane arm capable of stretching out to multiple shelf lines may increase the number of shelf lines served by the cranes, thereby significantly increasing the operational capability of the stoker system.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A stocking system for fabrication of a liquid crystal display device comprising:

a shelf assembly for storing a plurality of cassettes containing a plurality of substrates, the shelf assembly having a first shelf line and a second shelf line parallel and adjacent to the first shelf line, the first shelf line having a first plurality of storage compartments and the second shelf line having a second plurality of storage compartments, a first crane located at a front side of the first shelf line, the first crane for loading and unloading a cassette to and from the first shelf line, the first crane for loading and unloading the cassette to and from the second shelf line through one storage compartments of the first plurality of storage compartments;

a second crane located at a front side of the second shelf line, the second crane for loading and unloading the cassette to and from the second shelf line, the second crane for loading and unloading the cassette to and from the first shelf line through one storage compartments of the second plurality of storage compartments;

a third shelf line located parallel to the shelf assembly so that the first crane is located between the third shelf line and the shelf assembly;

a fourth shelf line located parallel to the shelf assembly so that the second crane is located between the fourth shelf line and the shelf assembly; and a control unit configured to:
  determine whether the first crane is operable;
  determine whether the second crane is operable;
  determine a number of the plurality of cassettes to be transported per unit time;
  compare the number of the cassettes with a present number; and
  operate at least one of the first crane and the second crane, depending on whether the first crane is operable, the second crane is operable, and the result of the comparing, wherein each of the storage compartments has a plurality of separator walls extending in a vertical direction; and a plurality of support protrusions protruding horizontally from the separator wall and arranged in the vertical direction, wherein each of the storage compartments of the horizontally adjacent first and second shelf lines is open on its front side and its back side for passing of the first crane or the second crane.

2. The stocking system of claim 1, wherein the storage compartments are arranged in a horizontal and a vertical direction.

3. The stocking system of claim 1, wherein each of the first and second cranes comprises:

a main frame for moving along a horizontal direction of the shelf assembly;

a vertical lift attached to the main frame, the vertical lift for moving up and down; and a crane arm linked with the vertical lift, the crane arm for moving outward horizontally from the vertical lift to the first shelf line and the second shelf line for loading and unloading a cassette to and from the shelf assembly.

4. The stocking system of claim 1, wherein the third shelf line comprises a plurality of storage compartments arranged in a horizontal and a vertical direction.

5. The stocking system of claim 1, wherein the fourth shelf line comprises a plurality of storage compartments arranged in horizontal and vertical direction.

* * * * *